United States Patent [19]
Nielsen

[11] Patent Number: 5,435,134
[45] Date of Patent: Jul. 25, 1995

[54] WAVE ACTIVATED POWER GENERATION SYSTEM

[75] Inventor: Kim Nielsen, Espergǎrde, Denmark

[73] Assignee: Danish Wave Power ApS, Kobenhavn K, Denmark

[21] Appl. No.: 39,492

[22] PCT Filed: Oct. 3, 1991

[86] PCT No.: PCT/DK91/00303
§ 371 Date: Apr. 30, 1993
§ 102(e) Date: Apr. 30, 1993

[87] PCT Pub. No.: WO92/06294
PCT Pub. Date: Apr. 16, 1992

[30] Foreign Application Priority Data
Oct. 3, 1990 [DK] Denmark .............................. 2389/90

[51] Int. Cl.⁶ ............................................. F16D 31/02
[52] U.S. Cl. ....................................... 60/398; 60/504; 417/331
[58] Field of Search ............... 60/398, 497, 504, 413; 417/330, 331, 332, 333, 337; 290/53; 403/309, 310, 311, 314

[56] References Cited

U.S. PATENT DOCUMENTS

| | | | |
|---|---|---|---|
| 1,665,140 | 4/1928 | Master | 417/331 |
| 2,064,440 | 12/1936 | Meeker | 403/314 |
| 4,091,618 | 5/1978 | Jackson | . |
| 4,218,192 | 8/1980 | West | 417/333 |
| 4,398,095 | 8/1983 | Ono | . |

FOREIGN PATENT DOCUMENTS 1542251  3/1979  United Kingdom ................. 417/332

Primary Examiner—F. Daniel Lopez
Attorney, Agent, or Firm—Watson, Cole, Grindle & Watson

[57] ABSTRACT

A wave activated power generation system comprises a pump to be located on the sea bottom. The piston of the pump is connected by a flexible connection to a float body to be located at the sea surface. The suction chamber of the pump is connected via a valve arrangement to a suction chamber which communicates with the surrounding sea through a water driven motor. In order to achieve a load equalization a gas reservoir with variable volume is provided in the suction chamber, the gas reservoir being separated from the surrounding sea.

7 Claims, 5 Drawing Sheets

WAVE ACTIVATED POWER GENERATION SYSTEM

BACKGROUND OF THE INVENTION

1. Field of the Invention

The present invention relates to a wave activated power generation system having a pump and a movable piston therein, the pump being connected to a water-driven motor for the supply of energy to a generator, the piston being displaced in the cylinder by action of wave energy on a float body, which pump is a single-acting pump designed to be located on the sea bottom, the piston of the pump being connected to the float body by means of a flexible connection effective exclusively to transfer tensile force and of such a length that in the mounted state of the system the float body is located at the sea surface, the pumping chamber of the pump being connected to a suction chamber via a valve arrangement, which suction chamber in the mounted state of the system communicates with the surrounding sea through the hydraulic motor.

2. The Prior Art

A wave activated power generation system of the above type is disclosed in U.S. Pat. No. 4,091,618. According to this prior art, the suction chamber is located under or after the outlet port of the hydraulic motor and the system is arranged in such a manner that a void can be provided under the outlet port or after the outlet port in the pumping chamber. In order to make the prior art system work the pump must be able to produce a pressure in the suction chamber which is lower than the pressure of saturated water vapor at the temperature prevailing in the suction chamber. In other words, the pressure should be reduced below the temperature which prevails in the suction chamber so as to cause boiling, thereby forming the void. Thus, it should be possible to fully utilize the water pressure which prevails at the sea bottom to drive the hydraulic motor. If such a void is formed, it will be possible to use it as a power source in case the sea surface is calm. Even at a low water depth such a system makes heavy demands on the pump in order for the pump to be able to provide the low vapor pressure mentioned above and the hydraulic motor should also be designed in a manner so as to enable it to utilize the generated large pressure difference.

SUMMARY OF THE INVENTION

The system according to the present invention is characterized in that the suction chamber contains or is connected to a reservoir of a variable volume for a gas amount separated from the surrounding sea. As a result, the requirements which the pump and the hydraulic motor have to meet are considerably reduced, as the pressure difference generated by the pump may produce a change of volume of the reservoir independent of the water depth even at modest pressure differences, which allows the system to be installed at great depths where the waves of the sea have a high energy and the gas amount separated from the surrounding sea can be utilized for the extension of the suction stroke of the pump. Thus, at heavy wave motion when the pump produces a pressure drop through the hydraulic motor which is greater than the capacity or load of the motor, the pump will draw more water from the suction chamber than the flow (amount of water per time unit) through the motor, thereby causing the gas to expand as a result of the underpressure thus generated and to contract when the pressure falls again and thereby to contribute to the actuation of the hydraulic motor. This load equalization can be further improved if the system is provided with two or more pumps which are connected to a joint suction chamber and which operate out-of-phase in a manner known per se.

An expedient embodiment of the system according to the invention is characterized in that the gas reservoir is constituted by a gas-filled chamber which is located above the water surface in the suction chamber, and that the outlet port of the hydraulic motor is located lower than the lowest water level in the suction chamber. As a result a particularly simple embodiment of the system is obtained, as one and the same chamber can constitute both the suction chamber and the reservoir since the low position of the outlet port of the hydraulic motor provides a water lock between the water in the suction chamber and the gas amount located above.

A further embodiment of the wave activated power generation system according to the invention is characterized in that the gas reservoir is constituted by an elastic container or a bellows located in the suction chamber. Thus, greater freedom as far as the position of the hydraulic motor is concerned is obtained, as the latter construction does not require that any minimum level as to water surface in the suction chamber be maintained.

In order to avoid that the pump is harmed in case of heavy wave motions, the connection between the piston and the float body is expediently arranged according to the invention so as to have great elasticity towards the impacts of tensile loads, i.e., an increase in tensile stress results in a relatively long extension.

Such a connection can be provided in several ways, e.g. the connection may consist of a cable with great elasticity or it may, e.g., consist of a wire which is connected to a spring.

According to the invention the valve arrangement may be provided with an adjustable pre-load so as to prevent it from opening until a suitable pressure difference is provided between the suction chamber and the pumping chamber. This results in the hydraulic motor not being activated until a suitable pressure drop is provided over the motor. In this manner the motor is prevented from being subjected to flow at a low pressure difference at which the efficiency of the motor is also low. Furthermore, a greater acceleration of the float body is obtained, which furthermore produces greater pump strokes and a higher energy absorption from the waves.

In a further embodiment of the wave activated power generation system several pumps with respective float bodies may be coupled to a joint reservoir, to which one or more hydraulic motors are connected. This results in a particularly satisfactory equalization of the flow through the hydraulic motor(s) as well as a reduction of the volume of buffer reservoir per pump.

The invention will now be explained in further detail with reference to the drawings.

DETAILED DESCRIPTION OF THE PREFERRED EMBODIMENT

Figure 1:
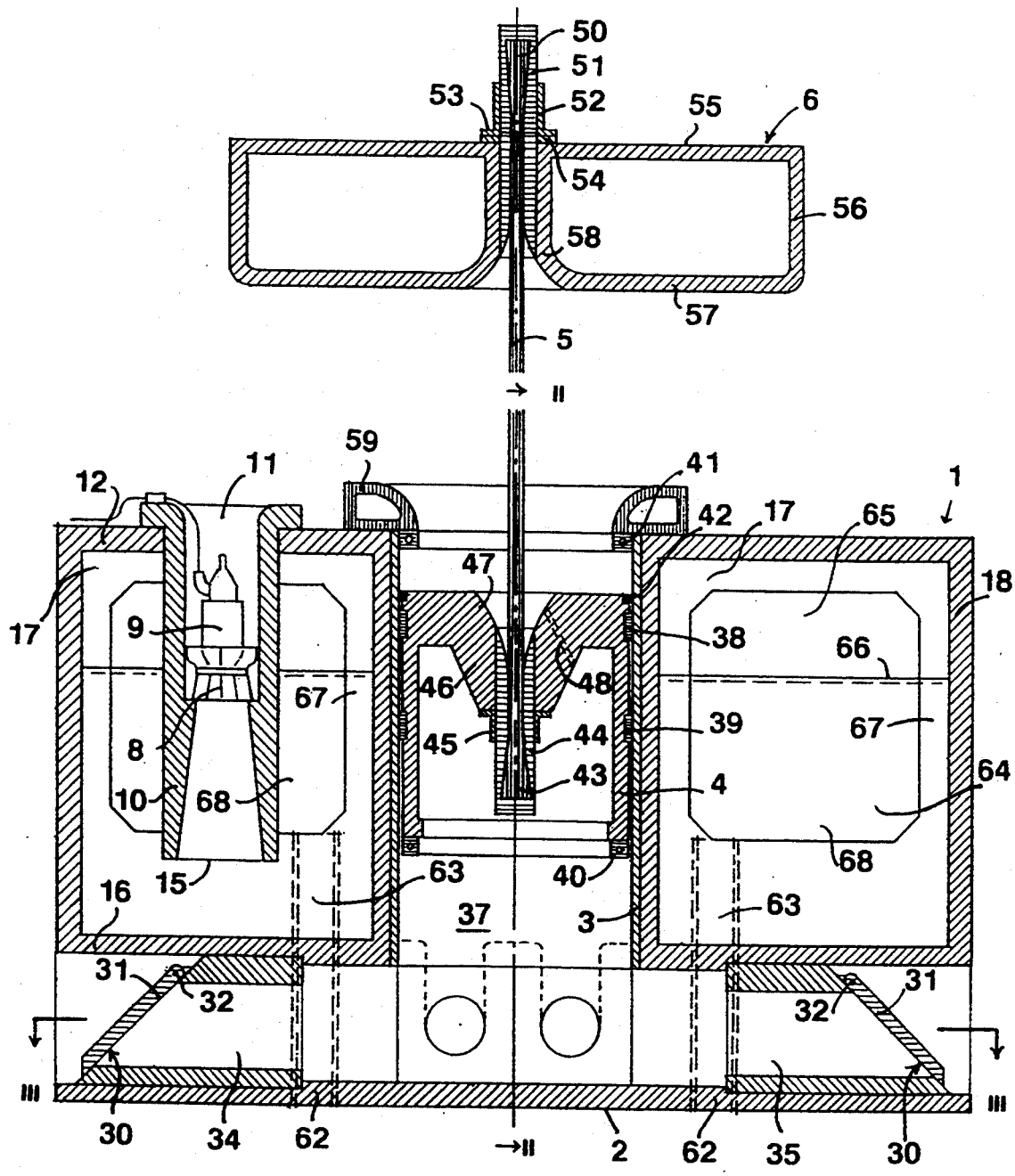
FIG. 1 shows a vertical sectional view through an embodiment of the system according to the invention along the line I—I of FIG. 3.

In the drawings 1 designates a housing which mostly consists of concrete and which is provided with a base 2 for mounting of the housing on the sea bottom. The housing contains a pump cylinder 3 having a piston 4 which by means of a connection 5 is connected to a float body 6 which in the mounted position of the system is located at the sea surface and thus is subjected to the prevailing wave motions, whereas the housing 1 is stationary in relation to the sea bottom.

The housing 1 contains a hydraulic motor in the form of a turbine 8 which is coupled to an electric generator 9. The turbine 8 and the generator 9 are incorporated into a cylindrical housing 10, the upper end 11 of which forms the inlet of the turbine and which is tightly connected to a cover 12 of the housing 1. The other end 15 of the housing 10 forms the outlet of the turbine and debouches shortly above a bottom 16 which together with the cover 12 forms a suction chamber 17.

Figure 4:
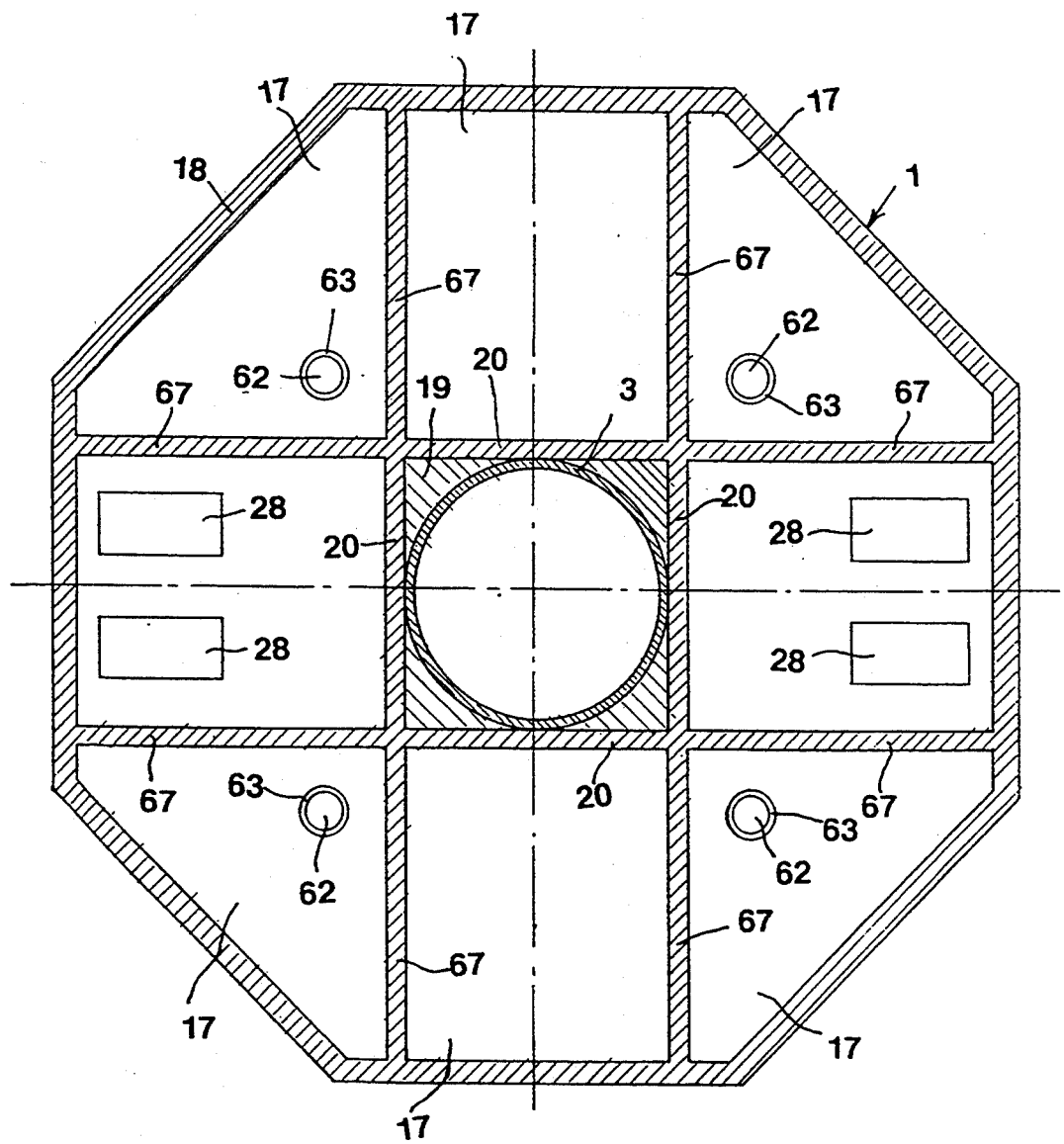
FIG. 4 shows a horizontal sectional view along the line IV—IV of FIG. 2
Figure 5:
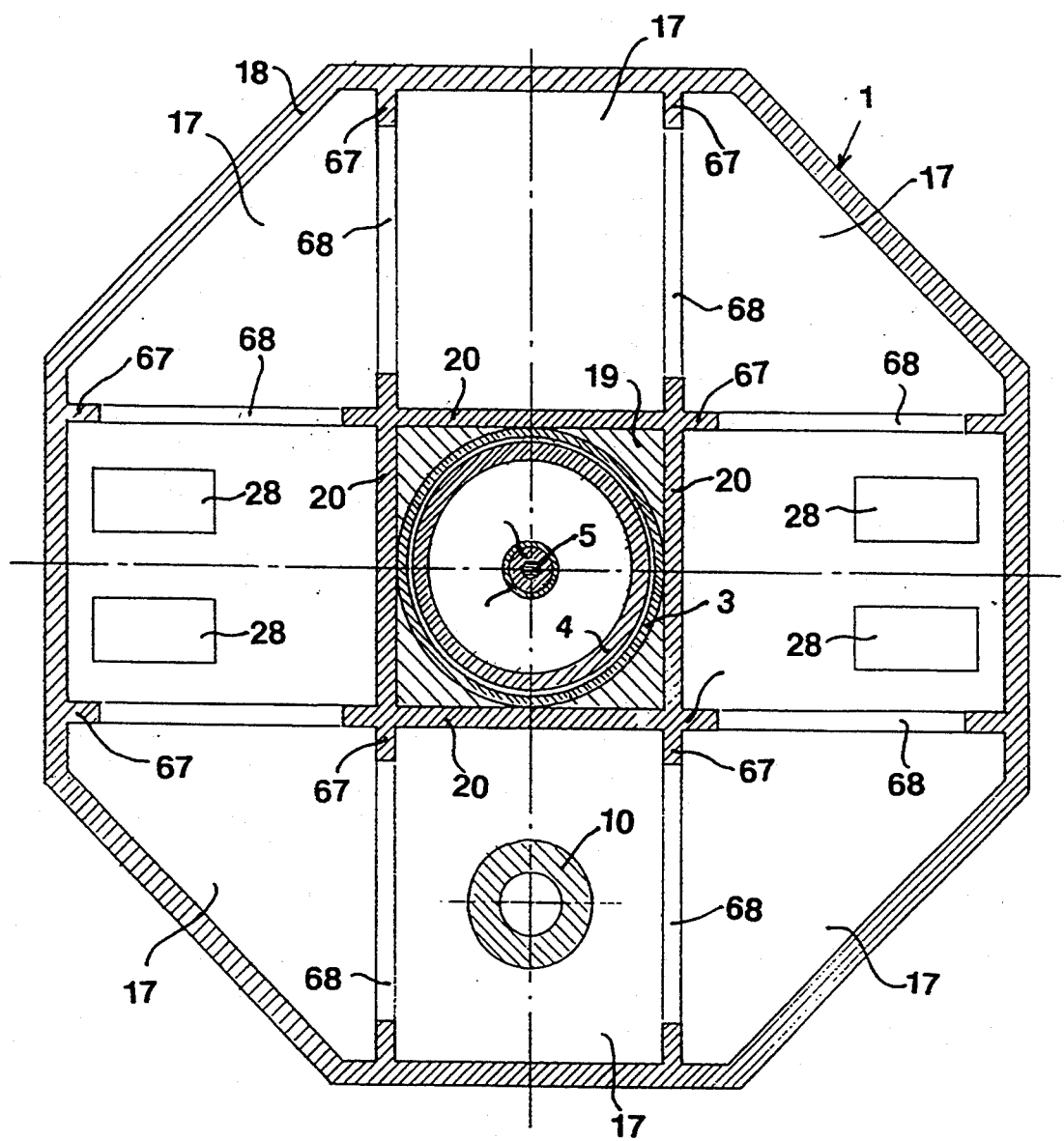
FIG. 5 shows a horizontal sectional view along the line V—V of FIG. 2.

In the embodiment shown in the drawings the housing 1 is octagonal and the outer walls of the housing within which the suction chamber 17 is contained are designated 18, the pump formed by the cylinder 3 and the piston being contained in an inner, square-formed chamber 19, the walls of which are designated 20, cf. FIGS. 4 and 5.

Figure 3:
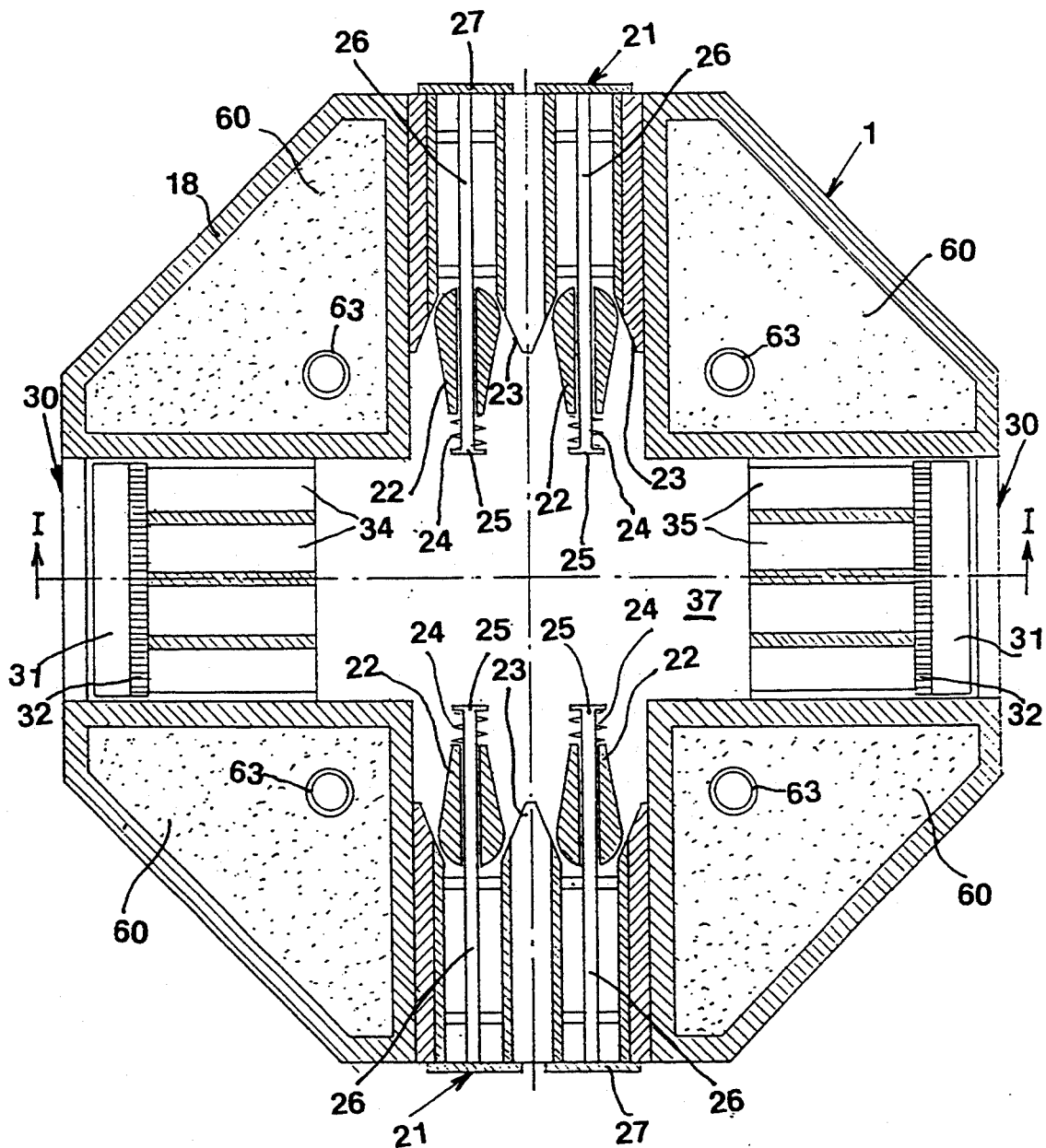
FIG. 3 shows a horizontal sectional view along the line III—III of FIG. 1.

In the base 2 an intake valve arrangement 21,21 is incorporated, which in the embodiment shown in the drawing, cf. FIG. 3, consists of four valves, each of which is provided with a substantially pear-shaped valve body 22. Each of these valve bodies cooperates with a substantially conical seat 23, and each valve body is actuated in direction towards its seat by means of a pre-load spring 24, the pre-load of which can be adjusted in a manner known per se and which, therefore, is not further indicated. The spring 24 is located between a head 25 on a rod 26 which extends tightly through the housing 1 and is maintained by means of a plate 27. The chambers behind each of the valve bodies 22 are closed outwardly and communicate with the suction chamber 17 through openings 28 in the bottom 16.

The base further includes an outlet valve arrangement 30,30 which in the embodiment shown consists of two valve flaps 31,31 which are hinged at the top by means of separate hinges 32,32. The valve flaps 31,31 serve to seal each set of outlet channels 34,35 in the base. Both the inlet valve arrangement and the outlet valve arrangement communicate with a chamber 37 which is in open connection with the lower end of the cylinder 3.

The cylinder 3 is designed as an inner lining and the piston 4 is provided with an upper and a lower slide ring 38 and 39, respectively, and at its lower end the piston is provided with a circumferential fender 40. Such a fender 41 is also found at the upper end of the cylinder to cushion any impacts of the piston ends during heavy wave motion. Besides, the top of the piston is provided with a sealing ring 42 to seal the gap between the cylinder and the piston and to prevent sand particles and other impurities from passing down between the outside of the piston and the inside of the inner lining of the cylinder.

In the embodiment shown in the drawings the connection 5 consists of a cable having elastic properties, i.e., it possesses high elastic extension at increasing tensile load which allows it to yield in case the float body 6 is subjected to heavy upward motions. In the present case the cable 5 is a monofilament cable of a plastic material, but it will be understood that the elastic properties may also be provided otherwise. The connection 5 may, e.g., consist of a steel wire in which a spring is inserted.

The lower end of the cable 5 is secured to the piston 4 due to an enlargement of the cable as indicated at 43, the enlargement being embedded in a holder 44 having its upper end embedded in a circumferential angle flange 45 which is secured to the downward facing end of a substantially funnel-shaped portion 46 constituting a part of the head of the piston. This funnel-shaped portion has outward projecting sides as indicated at 47 which allow the cable to be bent sideways without being exposed to any particularly acute angle, i.e., when the float body 6 is moved sideways the cable can not obtain a radius of curvature which is less than the shape of the sides of the funnel.

In order to prevent sand and impurities from accumulating in the funnel-shaped portion, the chamber of the funnel-shaped portion is connected to the underside of the piston by means of a narrow channel 48.

The upper end of the cable 5 is secured to the float body 6 in substantially the same manner, the upper end of the cable being wedge-shaped also, as indicated at 50, and embedded in a socket 51 which is embedded in a pipe bush 52 which via a circular flange 53 rests at the bottom on a bearing surface 54 on the upper side of the float body. At its lower end the socket 51 may be provided with threads which engage with the corresponding internal threads in the pipe bush 52, thereby allowing the distance between the piston and the float body to be adjusted by turn of the socket 51.

In the embodiment shown in the drawing the float body consists of a concrete construction having a flat upper cover 55, a cylindrical side wall 56 and a substantially flat bottom 57, in the middle of which a trumpet-like recess 58 is provided which acts just like the head of the piston, preventing the cable from being bent too sharply when the float body is displaced sideways.

A circumferential collar 59 having its inner side expanding upwards in a rounded manner is located above the cylinder 3 for further preventing the cable from being bent at an acute angle.

Below the bottom 16 between the inlet and outlet valve arrangements a ballast chamber 60 is formed, cf. FIG. 3, which may be filled with sand to save concrete for the housing 1 and to increase the total weight of the construction so as to make it rest steadily on the sea bottom.

As indicated in FIG. 4 the bottom 61 of the base 2 may be provided with openings 62 which, via pipes 63 which are indicated in FIG. 1 with dotted lines, communicate with the suction chamber 17, thereby causing the suction chamber to communicate with the underside of the housing 1. Suitable filter devices are inserted into the openings 62 to avoid intake of sand and other impurities. By means of these openings 62 it is possible to establish an underpressure along the under side of the housing 1 to provide a suction cup effect, and as a result the retention of the housing 1 to the sea bottom is further increased.

Figure 2:
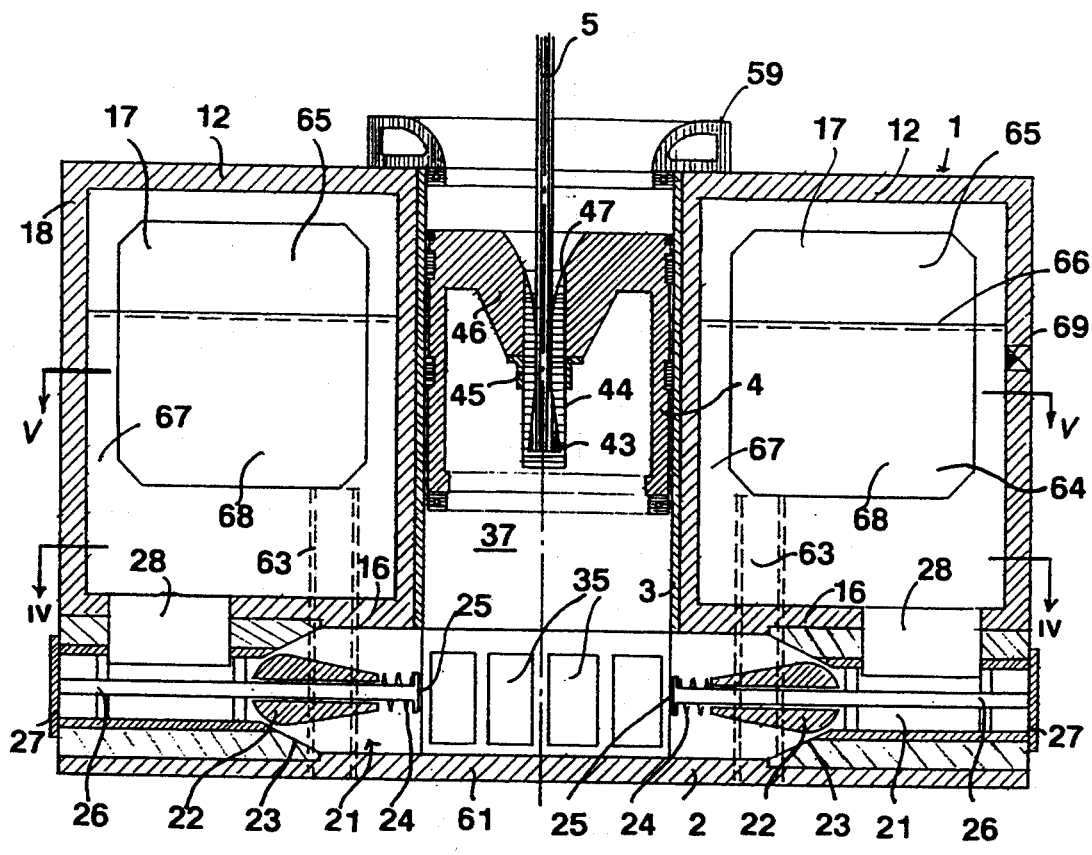
FIG. 2 shows a vertical sectional view along the line II—II of FIG. 1.

The suction chamber 17 around the pump arrangement serves to contain partly a water amount 64 and partly a gas amount 65 separated from the surrounding sea, cf. FIGS. 1 and 2, the level of the water amount 64 being designated 66. This gas amount 65 constitutes a pressure tank or pressure equalizer, also named reservoir, as will be further explained below.

The suction chamber 17 is divided into sections by means of supporting frame structures 67, through the openings 68 of which the sections communicate with each other.

The system shown operates in the following manner:

When the float body 6 moves upwardly it pulls the cable 5, which tends to displace the piston 4 upwards. As a result, a relative underpressure is provided below the piston and the underpressure will maintain the flap valves closed and tend to open the inlet valve arrangement. However, this will not happen until the pre-load provided by means of the springs 24 is surmounted, thereby causing the valve bodies 22 to open and allow intake into the pumping chamber 37 from the suction chamber 17 through the inlet openings 28. The underpressure thus generated in the suction chamber 17 will draw water through the turbine 8 to drive the generator. If the pressure drop generated between the intake side and the discharge side of the turbine is greater than what corresponds to the maximum flow through the turbine, the pump will at the same time draw some of the water amount 64 into its pumping chamber 37, thereby causing the water level 66 to fall, and an underpressure (relative) is thus provided in the gas reservoir 65. This underpressure will cause water to continue to flow through the generator when the suction effect of the pump stroke decreases or terminates, thereby keeping the generator working. Thus, this results in an "extension" of the effect of the suction stroke and hence an equalization of the load on the generator.

When the dead weight of the float body 6 exceeds its buoyancy as a result of a downward wave motion, the cable 5 will slacken and due to its dead weight the piston 4 will now move downwards and thereby cause the intake valve arrangement to close and at the same time cause the outlet valve arrangement 30,30 to open, as the flaps 31 open and water flows into the surrounding sea.

It will be understood that the dimensions of the system shown must be adjusted to the wave motions and the water depth for which the system in question is intended. In order to be able to equalize the vast pressure differences between the surrounding sea and the inside of the housing 1, a safety valve 69 is mounted in the wall of the housing 1 as indicated in FIG. 2. This valve may at the same time serve to introduce gas into the system in case some of the gas originally supplied should leak in the course of time or be carried away dissolved in water.

The valve may also serve to maintain the volume of the gas reservoir constant by the supply of gas during the submersion to the sea bottom of the housing 1 with appertaining parts, and thus the upward force which is to be used during the submersion also becomes constant, which facilitates the submersion and makes less demands on the submersion equipment.

In the embodiment shown the gas reservoir is contained in the suction chamber 17 above the water level 65 due to the low position of the outlet 15 of the turbine so that the housing 10 of the turbine forms a water lock at the varying water content of the suction chamber 17 during the operation of the system. At the same time the safety valve 69 serves to prevent the water level from falling below the turbine outlet 15 in case a correspondingly low pressure should be generated in the suction chamber 17, as the safety valve 69 will open and introduce water into the suction chamber in order to maintain the level above the turbine outlet.

However, it will be immediately understood that the gas may be contained in another form of the reservoir, e.g., in an elastic container or bellows located in the suction chamber 17 or the gas reservoir may be constituted by a container which is connected to the suction chamber above the turbine outlet.

In a particular embodiment several pumps 3,4 having appertaining respective float bodies 6 may be connected to a joint buffer reservoir 65 via suitable buffer valves (not shown). The water may be directed to the reservoir 65 through one or more turbines 8 having respective generators 9. The use of several pumps in connection with a joint buffer reservoir results in a further equalization of the flow through the turbine(s). Furthermore, a reduction of the necessary volume of the buffer reservoir per pump is obtained.

I claim:

1. A wave-activated power generation apparatus which comprises:

a float means for floating on a surface of water above a seabed and for moving up and down with passage of waves along the water surface, a structure positioned on the seabed generally beneath said float means, said structure comprising:

a housing which defines therein a single pump chamber and a suction chamber, said housing including a base that has an opening therein and is positioned on the seabed, and a pipe communicating said opening with said suction chamber, said suction chamber containing water and either gas above the water or connected to a reservoir containing gas, a pump cylinder mounted within said single pump chamber, a piston movably mounted within said pump cylinder, said single pump chamber beneath said piston containing water, a channel means for enabling water from around said housing to flow into said suction chamber, said channel means defining a lower end which is lower than the water level in said pump chamber, a turbine positioned within said channel means for rotation upon the passage of water through said channel means, an electrical generator connected to said turbine for the generation of electrical power upon the rotation of said turbine, and valve means for communicating said suction chamber with said single pump chamber beneath said piston when said piston is moved upwardly by upward movement of said float means and for communicating said pump chamber beneath said piston to the water around said housing when said piston moves downwardly with downward movement of said float means, and a flexible line connecting said float means with said piston.

2. A wave-activated power generation apparatus according to claim 1, wherein said gas is located above the water in said suction chamber.

3. A wave-activated power generation apparatus according to claim 1, wherein said housing includes an elastic container or bellows in said suction chamber containing said gas.

4. A wave-activated power generation apparatus according to claim 1, wherein said flexible connection line is elastic.

5. A wave-activated power generation apparatus according to claim 1, wherein said flexible connection line is an elastic cable.

6. A wave-activated power generation apparatus according to claim 1, wherein said valve means includes an intake valve which includes a valve body which is movable relative to a valve seat, and an adjustable load means which biases said valve body against said valve seat to prevent water flow from said suction chamber to said pump chamber until sufficient suction in said pump chamber overcomes the force of said load means.

7. A wave activated power generation apparatus according to claim 1, wherein several pumps with respective float bodies are coupled to a joint suction chamber, to which one or more water-driven motors are connected.

* * * * *